(12) United States Patent
Huang et al.

(10) Patent No.: US 7,003,195 B1
(45) Date of Patent: Feb. 21, 2006

(54) DYNAMIC POWER EQUALIZER

(75) Inventors: Ding-Wei Huang, Hsinchu (TW);
Shih-Jung Chang, Hsinchu (TW);
Tsung-Hsuan Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/099,593

(22) Filed: Apr. 6, 2005

(30) Foreign Application Priority Data

Dec. 22, 2004 (TW) ................ 93140060 A (51) Int. Cl.
*G02B 6/28* (2006.01)
(52) U.S. Cl. .................... 385/24; 385/15; 385/37
(58) Field of Classification Search ............... 385/15, 385/24, 37
See application file for complete search history.

(56) References Cited

U.S. PATENT DOCUMENTS

| 6,429,962 B1 | 8/2002 | Xu et al. |
| 6,556,766 B1 | 4/2003 | Cheung et al. |
| 6,807,372 B1 * | 10/2004 | Lee et al. .......... 398/78 |
| 2005/0152642 A1 * | 7/2005 | Xu et al. .......... 385/24 |

FOREIGN PATENT DOCUMENTS

JP          07-098424       4/1995

OTHER PUBLICATIONS

Maru et al., *High Resolution Dynamic Gain Equalizer Using Super-High Δ Planar Lightwave Circuit Technology*, vol. 1, pp172-173, OFC 2003.

* cited by examiner

*Primary Examiner*—Jennifer Doan
(74) *Attorney, Agent, or Firm*—Rabin & Berdo, P.C.

(57) ABSTRACT

A dynamic power equalizer comprises an array waveguide grating having an input waveguide and an output waveguide at one end, and an input waveguide group and an output waveguide group at the other end. The double loops are composed of the input waveguide and the output waveguide group, and the input waveguide group and the output waveguide are used to process the input optical signal components having different powers into the output optical signal having a single and equalized optical power through wavelength-division de-multiplexing and wavelength-division multiplexing, thus achieving dynamic optical power equalization.

11 Claims, 8 Drawing Sheets

DYNAMIC POWER EQUALIZER

BACKGROUND OF THE INVENTION

1. Field of the Invention

The invention relates to a dynamic power equalizer, and especially to a dynamic power equalizer having double-loop array wave-guide gratings.

2. Related Art

The trend of optical wave communication systems of the next generation is toward the development and enhancement of the technologies of Dense Wavelength-Division Multiplexing (hereinafter abbreviated and referred to as DWDM) and Dynamic Add/Drop. In this dynamic DWDM communication system, the system manager is capable of taking out or adding in signals of the required wavelength at the pertinent node, or altering the communication channel of any wavelength depending on the actual requirements. As such, the frequency number of the components of the optical signal entering the optical fiber amplifier at the relay node is no longer a fixed number, thus the variation of the power intensity of the input signal causes variation of the gain vs. frequency relations of the optical fiber amplifier, which in turn causes variation of the originally smooth and even gain vs. frequency relations of the DWDM communication system, thus resulting in the increase of distortion and erroneous coding rate. Therefore, the design and development of the dynamic power equalizer that is capable of accommodating the input signals of dynamically varying frequency ranges is the most important task for the designer of the DWDM communication system.

Presently, the technology employed in manufacturing the dynamic power equalizer mainly involves manufacturing the dynamic power equalizer module through the combination of conventional optical elements and components of the optical power adjustment mechanism by means of hybrid packaging. For example, the cascaded multi-stage liquid crystal birefringent filter disclosed in U.S. Pat. No. 6,429,962 is utilized to produce an optical power adjustment mechanism having optical wave filtering functions. In addition, the see-saw array is made by means of the Micro Electro-Mechanical System (MEMS) as disclosed in U.S. Pat. No. 6,556,766 to match and cooperate with the optical power adjustment mechanism having optical wave filtering functions. The assembly and packaging of the above-mentioned dynamic power equalizer module is realized by making use of the traditional components of the lens and optical crystal, etc. As such, it is quite bulky, thus having high assembly and packaging cost, and it is not feasible for mass production.

Figure 1:
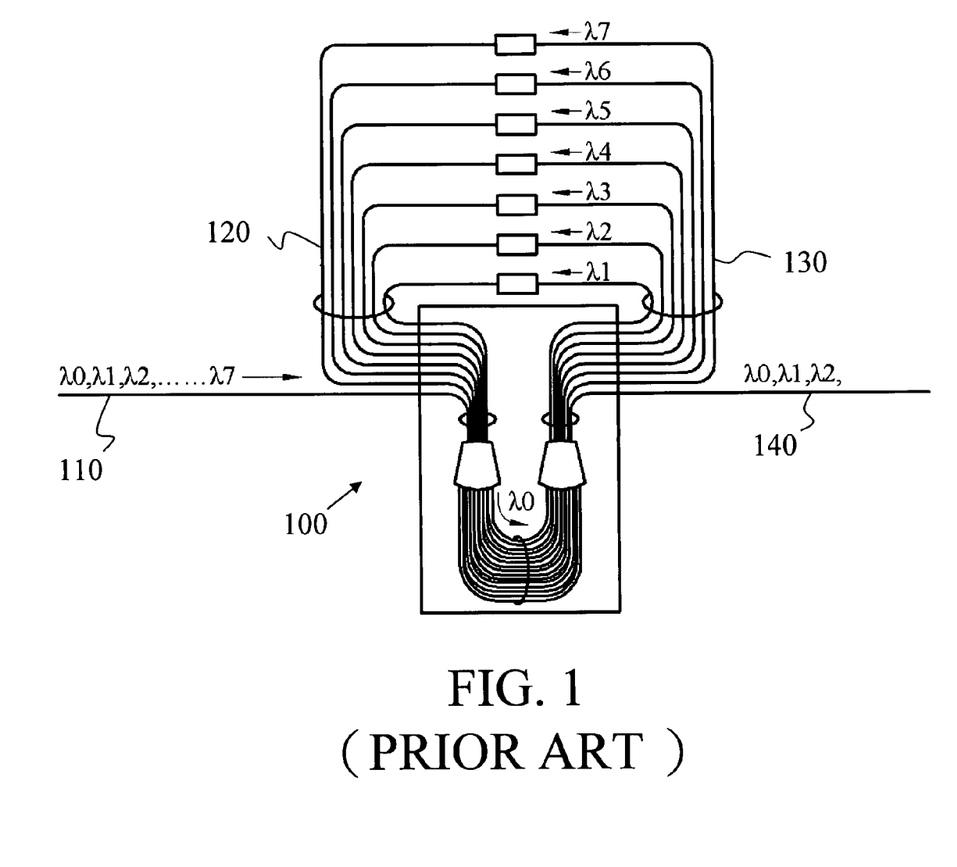
FIG. 1 is a schematic diagram of the dynamic power equalizer according to the prior art.

For more detailed description of the conventional optical power equalizer, please refer to FIG. 1. As shown in FIG. 1, the dynamic power equalizer having the array waveguide grating 100 as disclosed in JP 07-98424 is provided with a plurality of input wave guides 110,120 at one end, and a corresponding plurality of output waveguides 130,140 at the other end. Although the structure of its constituting loops is relatively simple, the lead in and lead out of its optical signals is prone to be misguided into different loops. For example, when the optical signal is guided in through one end of the input wave-guide of the array waveguide grating 100, it should be led out from wave guide 130 after being processed by the array waveguide grating 100. However, in actuality, some of the optical signals may be output from the output waveguide 140, and thus its operation stability is unsatisfactory.

SUMMARY OF THE INVENTION

In view of the above-mentioned problems and shortcomings of the prior art, the object of the invention is to provide a dynamic power equalizer, comprising an input waveguide and an output waveguide at one end of the array waveguide grating, and an output waveguide group and input waveguide group at the other end of the array waveguide grating, thus constituting the array waveguide grating having double loops so as to solve the problems and of the prior art.

In order to achieve the above-mentioned objective, the invention provides a dynamic power equalizer, which is utilized to receive multi-wavelength input optical signals, with its components having different optical powers, and process them into multi-wavelength output optical signal having a single optical power. The said dynamic power equalizer mainly comprises an array waveguide grating, a first input waveguide, a first output waveguide group, a second input waveguide group, and a second output waveguide. The array waveguide grating is provided with a first end and a second end, with the first end having the first input waveguide and the second output waveguide, and with the second end having the first output waveguide group and the second input waveguide group. As such, the first input waveguide and the first output waveguide group constitute a first lightwave circuit in the array waveguide grating, and the second input waveguide group and the second output waveguide constitute a second lightwave circuit in the array waveguide grating.

When the input optical signal is input into the first lightwave circuit of the array waveguide grating through the first input waveguide, they are de-multiplexed into a plurality of wavelength-divided optical signal components having different optical powers, and then these components are equalized into a plurality of optical signal components having the same equalized optical power, and which are subsequently output from the first output waveguide group. These optical signal components are input into the second lightwave circuit of the array wave-guide grating through the second input waveguide group, then multiplexed into a single output optical signal having the single equalized optical power and output from the second output waveguide.

The objective, construction, functions, and characteristics of the invention can be understood more thoroughly through the following detailed description of the preferred embodiment together with the attached drawings.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 2:
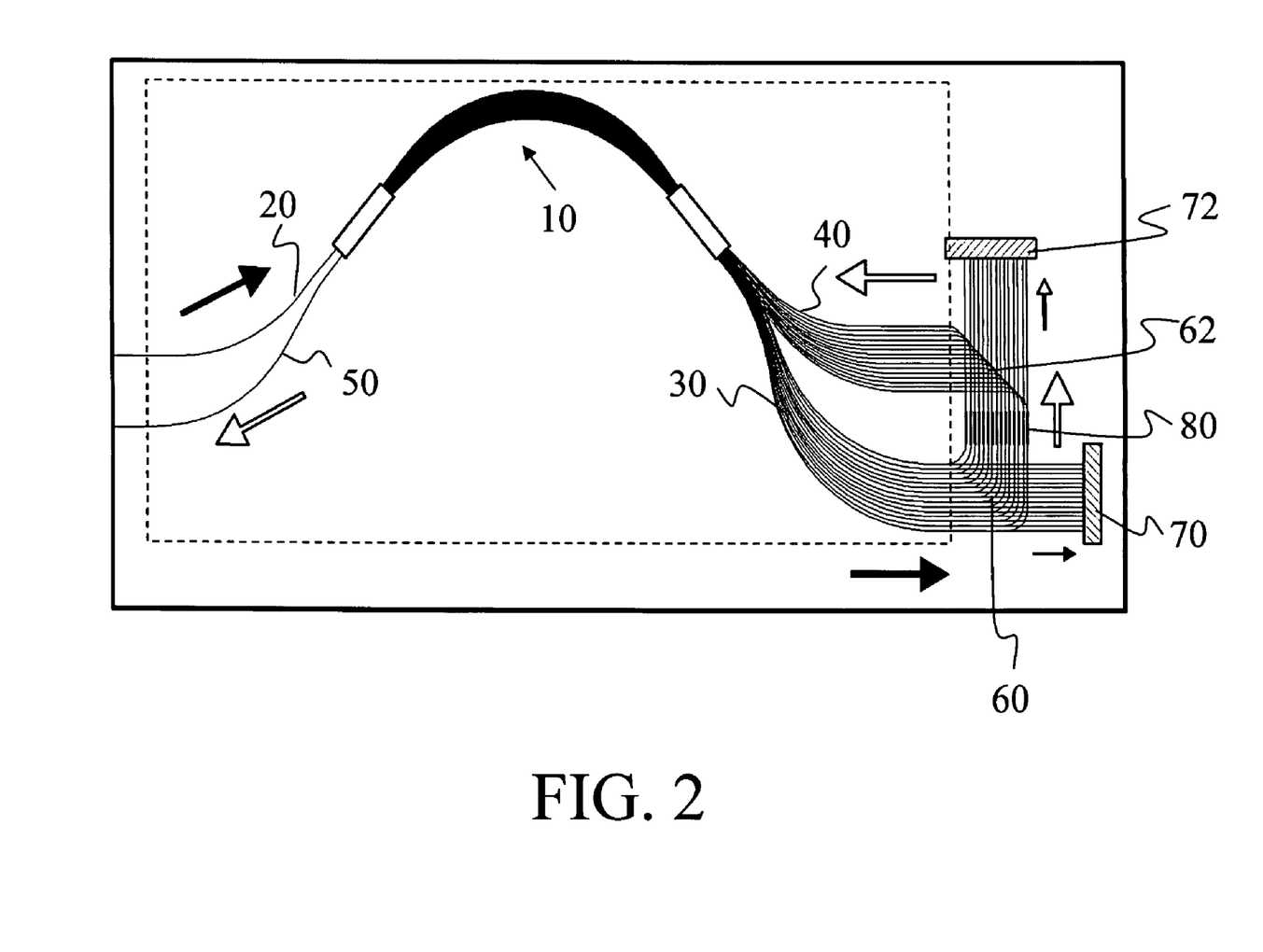
FIG. 2 is a schematic diagram of the dynamic power equalizer according to the invention.

As shown in FIG. 2, the dynamic power equalizer provided by the invention is utilized to dynamically adjust the optical power of each component of the input optical signal to equal intensity depending on the wavelengths of the various components. The adjusted optical signal is then output to achieve the object of dynamic optical power equalization. The dynamic power equalizer is mainly composed of: an array waveguide grating 10, a first input waveguide 20, a first output waveguide group 30, a second input waveguide group 40 and a second output waveguide 50. The two ends of the array waveguide grating 10 are defined as the first end and the second end respectively, with its first end provided with a first input waveguide 20 and a second output waveguide 50, and with its second end provided with a first output waveguide group 30 and a second input waveguide group 40. In addition, the first lightwave circuit formed in the array waveguide grating 10 by the first input waveguide 20 and the first output waveguide group 30 is used to achieve the same purpose and function of the Wavelength-Division De-multiplexer. When the input optical signal is guided in via the first input waveguide 20, it is divided into a plurality of components depending on its wavelength through the processing of the array waveguide grating 10, and each component is output sequentially from each of the first output waveguide group 30. Furthermore, the second lightwave circuit formed in the array waveguide grating 10 by the second input waveguide group 40 and the second output waveguide 50 is used to achieve the same purpose of the Wavelength-Division Multiplexer. Its function is to lead via the second input waveguide group 40 sequentially in the reverse direction the various wavelength (or frequency) components of the above-mentioned optical signal into the array waveguide grating 10. After processing by the said grating, the various frequency components of the original optical signal are multiplexed and recombined into one signal and output from the second output waveguide 50.

Figure 3:
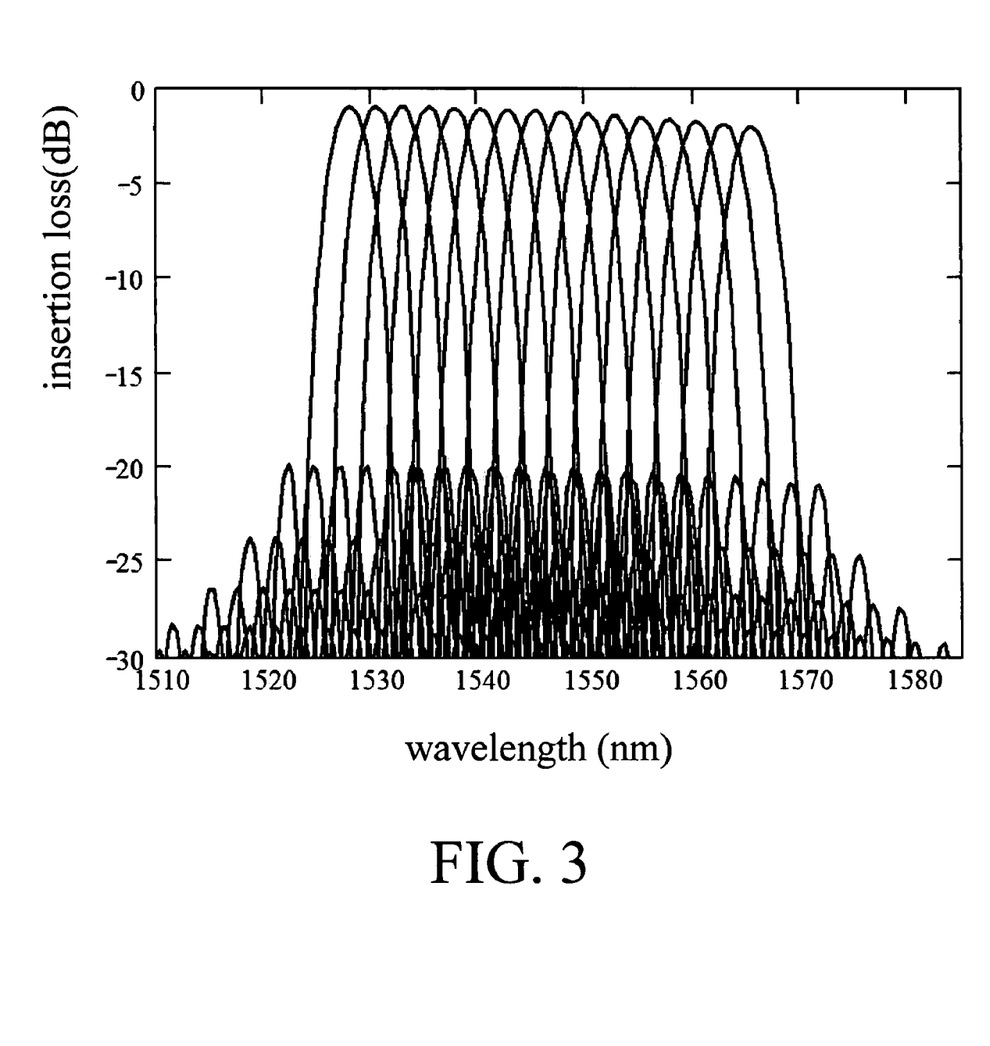
FIG. 3 is the insertion loss vs. wavelength relation for the respective wavelengths of the Wavelength-Division De-multiplexer composed of the first input waveguide and the first output waveguide group according to the invention.
Figure 4:
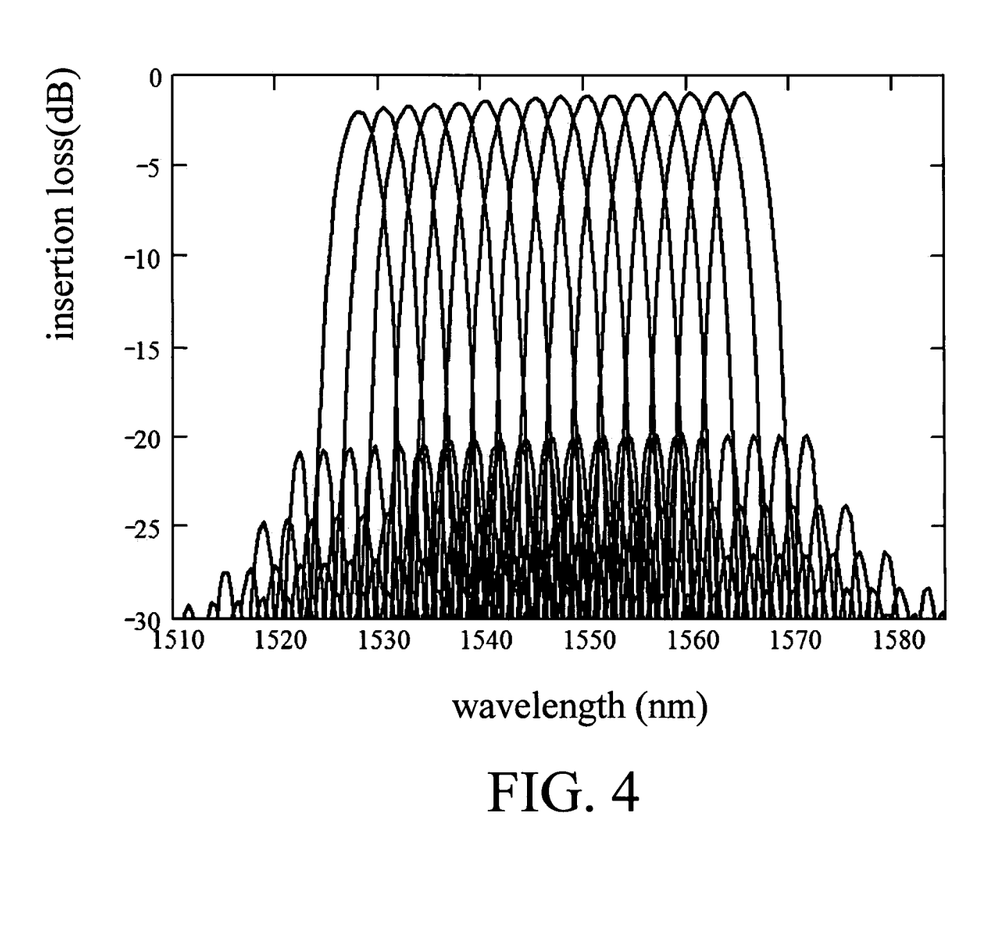
FIG. 4 is the insertion loss vs. wavelength relation for the respective wavelengths of the Wavelength-Division Multiplexer composed of the second input waveguide group and the second output waveguide according to the invention.

The double-loop array waveguide grating 10 of the dynamic power equalizer is characterized by the following features:

Firstly, as shown in FIGS. 3 and 4, each of the respective wavelength components of the optical signal processed by the Wavelenth-Division De-multiplexer composed of the first input waveguide 20 and the first output waveguide group 30 (as shown on the horizontal axis of FIG. 3) corresponds to each of the respective wavelength components of the optical signal processed by the Wavelenth-Division Multiplexer composed of the second input waveguide group 40 and the second output waveguide 50 (as shown on the horizontal axis of FIG. 4).

Secondly, the available frequency range of the array waveguide grating 10 is at least twice that of the combined frequency ranges of the Wavelenth-Division Demultiplexer and Wavelenth-Division Multiplexer. Therefore, the optical signal input through the first input waveguide 20 is output only from the first output waveguide group 30, and it is not misguided into the second input waveguide group 40, even through the high-order diffraction of the array waveguide grating 10. Similarly, the optical signal input via the second input waveguide group 40 is output only from the second output waveguide 50, and it is also not misguided into the first input waveguide 20.

As shown in FIG. 2, the splitters 60 and 62 may be disposed outside the array waveguide grating 10, thus splitting the optical signals of different frequencies with unequal optical powers. In addition, the optical diode arrays 70 and 72 may be provided to detect the power of different frequency optical signals having different optical powers. Furthermore, an optical power processor 80 may be provided, which is used to adjust and equalize the optical signal components of different frequencies having different optical powers into the optical signal components of different frequencies having equalized optical power. In this embodiment, the light heating type optical power attenuator or semiconductor optical power amplifier is utilized as the optical power processor. In addition, the waveguide dynamic power equalizer is capable of achieving the function of dynamically adjusting and equalizing the power of the input optical signal of the multi-frequency components in cooperation with the circuit automatic feedback control. As such, the double-loop dynamic power equalizer of the invention, comprising the array wave guide grating 10, the splitters 60 and 62, optical power processor 80, and the optical diode arrays 70 and 72, can be integrated into the optical waveguide chips on the same substrate by means of the semiconductor manufacturing process and the related packaging technology, thus realizing the single chip integrated dynamic power equalizer.

When the input optical signal (hereinafter, the input multi-wavelength optical signal, the wavelength divided optical signals of various wavelengths, the power equalized multi-wavelength optical signal, and the output single optical signal are abbreviated and referred to as the input optical signal, wavelength-divided optical signal, optical signal, and the output optical signal, respectively) is guided into the first lightwave circuit through the first input waveguide 20 of the array waveguide grating 10 having double loops, it is processed by the array waveguide grating 10 into a plurality of wavelength-divided optical signal components of different frequencies and different optical powers. Each of the wavelength-divided optical signal components is output from the first output waveguide group 30 of the array waveguide grating 10 and coupled to the splitter 60, with 5% of its optical powers being diverted and coupled to the optical diode 70 to be used to detect the optical power intensity of each of the wavelength-divided optical signal components. The remaining 95% of the optical power of the wavelength-divided optical signal components is diverted and coupled to the optical power processor 80. The optical power of each of the wavelength-divided optical signal components is adjusted properly, and then they are coupled to the splitter 62, with 5% of it optical power being diverted and coupled to the optical device 72 to detect the optical power intensity of each of the adjusted wavelength-divided optical signal components. The remaining 95% of the optical power of the wavelength-divided optical signal components is diverted and coupled to the second lightwave circuit of the array waveguide grating 10 through the second input waveguide group 40. The components of the optical signals are multiplexed into an output optical signal of an equalized optical power, and the multiplexed and recombined optical signal is finally output from the second output waveguide 50, thus completing and realizing the entire process of dynamic optical power equalization.

In the above-mentioned configuration, the optical power intensities of the wavelength-divided optical signal components detected by the two groups of optical diodes 70 and 72 are processed through the external feedback control circuit to decide the amount of adjustment applied to each of the wavelength-divided optical signal components by the optical power processor, thus achieving the optimal effect of dynamic optical power equalization.

Figure 5:
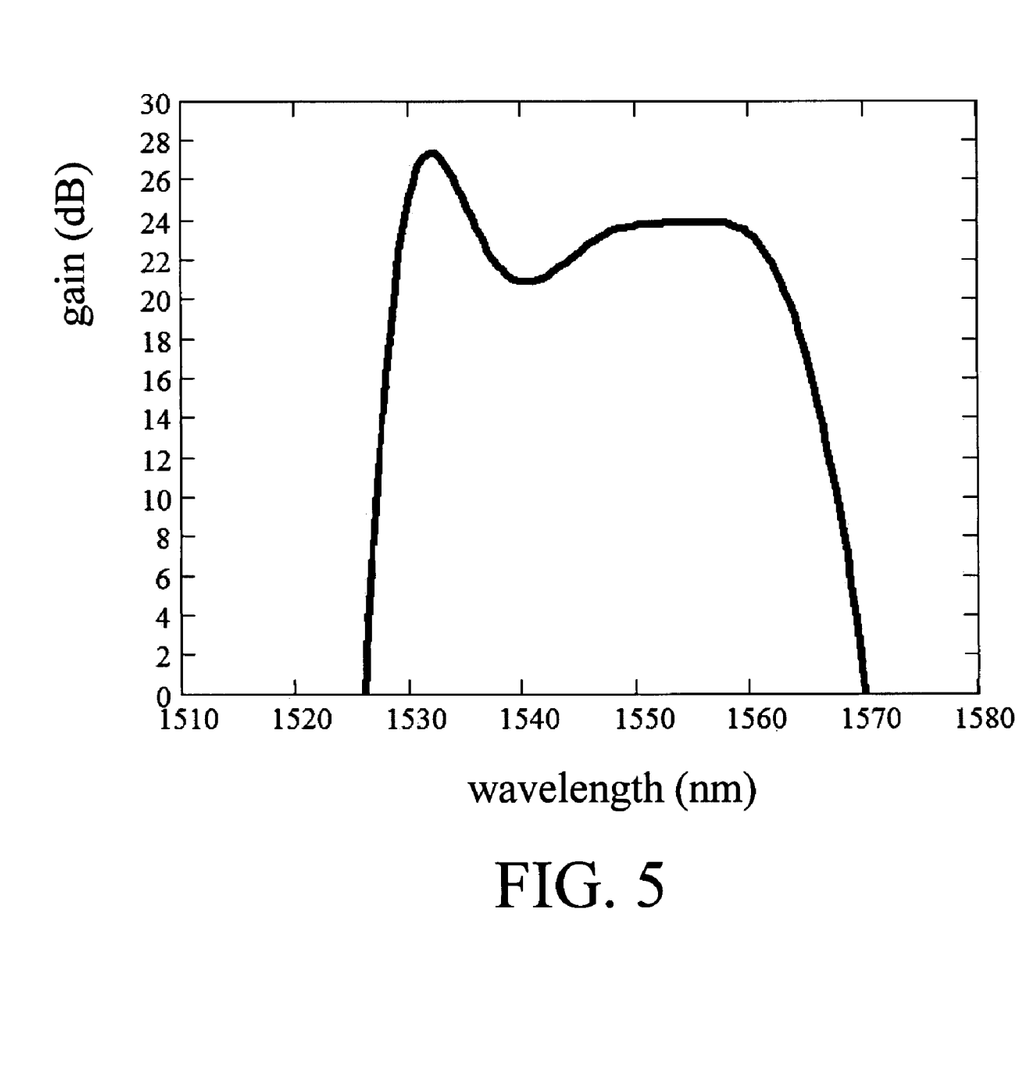
FIG. 5 is the gain vs. wavelength relation of the typical erbium-doped optical fiber amplifier according to the invention.
Figure 6:
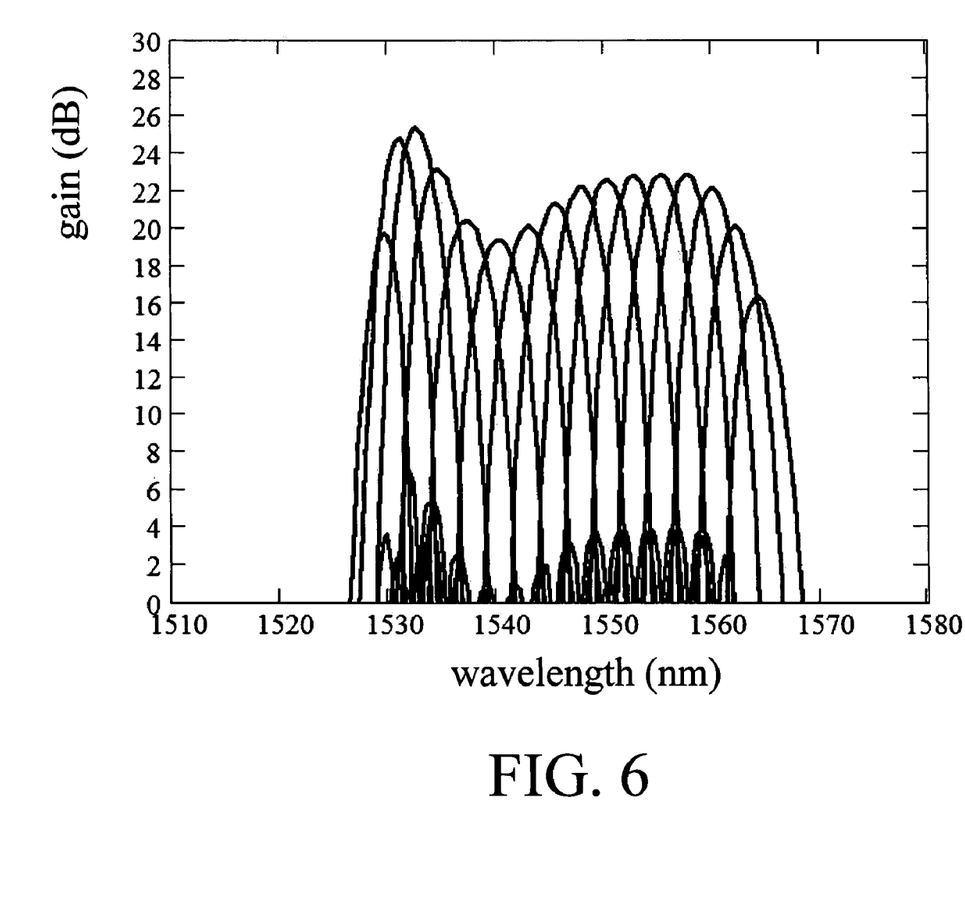
FIG. 6 shows the equivalent gains of the respective wavelength-divided optical signal components obtained from the first group optical diode by making use of the erbium-doped optical fiber amplifier of the invention.
Figure 7:
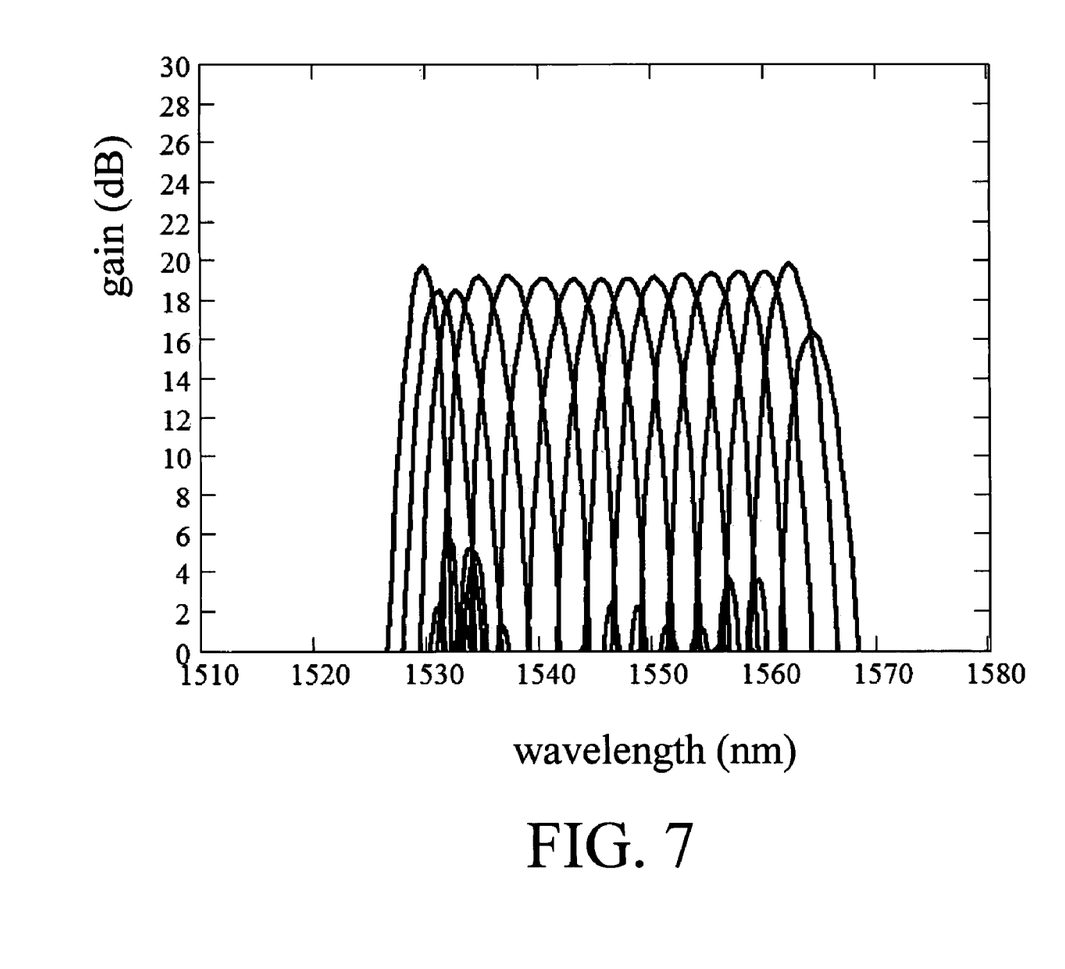
FIG. 7 shows the equivalent gains of the respective wavelength-divided optical signal components obtained from the second group optical diode after being adjusted by the optical power processor by making use of the erbium-doped optical fiber amplifier of the invention.
Figure 8:
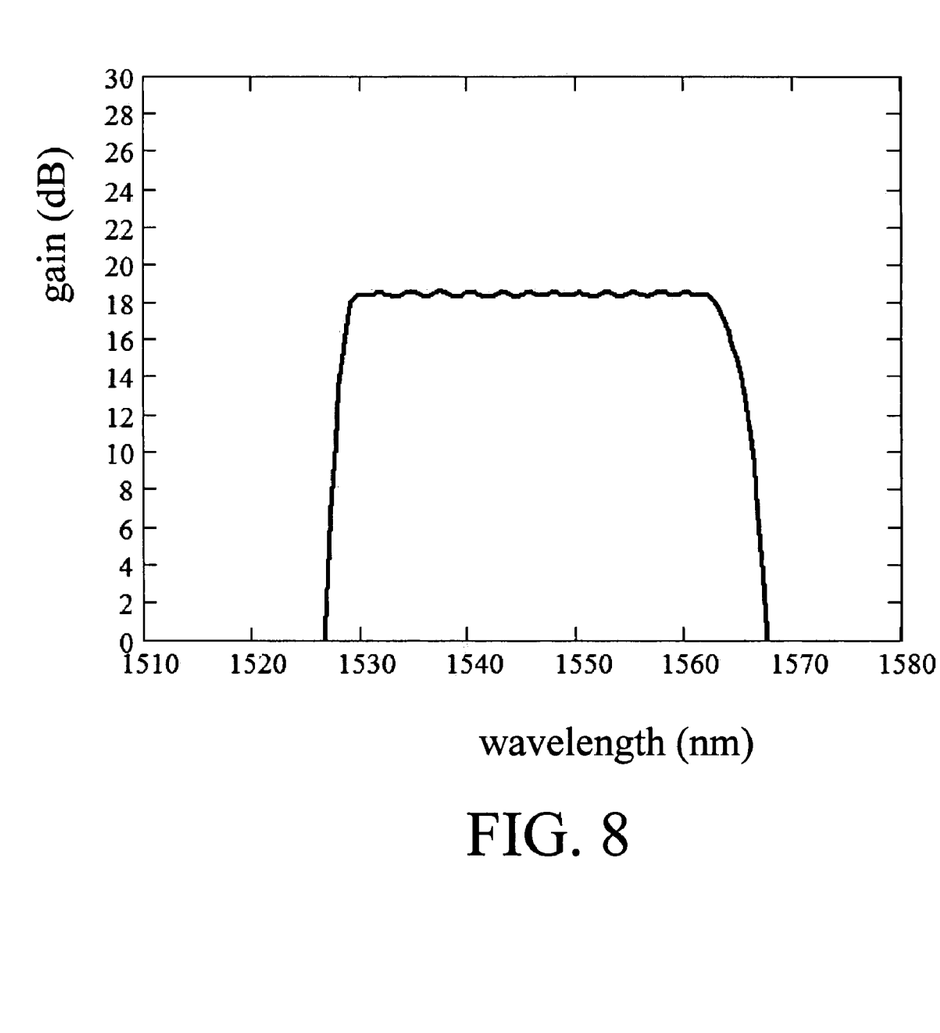
FIG. 8 is the resulting smooth and even gain vs. wavelength relation obtained by making use of the erbium-doped optical fiber amplifier of the invention.

The dynamic power equalizer of the invention can also be applied in the power equalization of the optical communication channels by making use of the Erbium-doped Optical Fiber Amplifier (EDFA), thus achieving the effect of dynamic gain smoothing. FIG. 5 shows the gain vs. wavelength relations of a typical EDFA. Upon being input via the first input waveguide 20, the input optical signal is processed by the array waveguide grating 10, and then it is output from the first output waveguide group 30 of the double-loop array waveguide grating. These output signal components are detected and measured by the optical diode 70 to obtain the equivalent gain of each of the wavelength-divided optical signal components, as shown in FIG. 6. Then these optical signal components are processed by the feedback control circuit, and with their optical power being adjusted through the optical power processor 80, the equivalent gain of each of wavelength-divided optical signal components can be obtained through the detection of the optical diode 72, as shown in FIG. 7. Subsequently, the adjusted signal components are input to the second input waveguide group 40 and are multiplexed and recombined by the array waveguide grating 10 into one signal. This single optical signal is finally output from the second output waveguide 50, thus achieving the smooth and even gain vs. wavelength relations, as shown in FIG. 8.

In sum, the dynamic power equalizer of the invention can be utilized and applied in optical communication systems to achieve the purpose of dynamic optical power equalization by means of the design of the double-loop array waveguide grating. In addition, the construction of this dynamic power equalizer is much simplified and its assembly and packaging are much easier, thus solving the drawbacks of bulky size, high packaging cost and impossibility of mass production of the filter as disclosed in U.S. Pat. No. 6,429,962. Moreover, the double-loop array waveguide grating structure of the invention can be utilized so that the input and output optical signals are not misguided into the incorrect loops, thus solving the problem of the dynamic power equalizer as disclosed in JP07-98424, and achieving greater stability in optical signal communications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic power equalizer, which is utilized to receive a multi-wavelength input optical signal having wavelength-divided components of different optical powers and process it into a multi-wavelength output optical signal having wavelength-divided components of a single equalized optical power, comprising:
   a double-loop array waveguide grating having the corresponding first end and second end;
   a first input waveguide and a first output waveguide group, disposed respectively at the first end and the second end of the array waveguide grating, and constituting a first lightwave circuit in the array waveguide grating; and
   a second input waveguide group and a second output waveguide, disposed at the second end and the first end of the array waveguide grating, and constituting a second lightwave circuit in the array waveguide grating;
   wherein, the input optical signal is input into the first lightwave circuit of the array waveguide grating via the first input waveguide, and is de-multiplexed into a plurality of wavelength-divided optical signal components,
   wherein the wavelength-divided optical signal components are output from the first output waveguide group, and are equalized into a plurality of optical signal components of different frequencies having equalized optical power, and
   wherein the optical signal components of different frequencies are input into the second lightwave circuit of the array waveguide grating through the second input waveguide group, and are output from the said second output multiplexed into the output optical signal of a single equalized optical power, and the output optical signal is output from the second output waveguide.

2. The dynamic power equalizer of claim 1, further comprising a splitter, connected externally to the array waveguide grating, and used to split the wavelength-divided optical signal components.

3. The dynamic power equalizer of claim 2, wherein the array waveguide grating, the first input waveguide, the second output waveguide, the second input waveguide group, the first output waveguide group, and the splitter are integrated on a substrate.

4. The dynamic power equalizer of claim 1, further comprising a photodiode array, connected externally to the array waveguide grating, and used to detect the optical powers of the wavelength-divided optical signal components.

5. The dynamic power equalizer of claim 4, wherein the array waveguide grating, the first input waveguide, the second output waveguide, the said second input waveguide group, the first output waveguide group, and the photodiode array are integrated on the same a substrate.

6. The dynamic power equalizer of claim 1, further comprising an optical power processor, connected externally to the array waveguide grating, and used to adjust and equalize the powers of the wavelength-divided optical signal components.

7. The dynamic power equalizer of claim 6, wherein the optical power processor is an optical power amplifier.

8. The dynamic power equalizer of claim 7, wherein the optical power amplifier is a semiconductor power amplifier.

9. The dynamic power equalizer of claim 6, wherein the array waveguide grating, the first input waveguide, the second output waveguide, the second input waveguide group, the first output waveguide group, and the optical power processor are integrated on a substrate.

10. The dynamic power equalizer of claim 6, wherein the optical power processor is an optical power attenuator.

11. The dynamic power equalizer of claim 10, wherein the optical power attenuator is a light heating type optical power attenuator.

* * * * *